US007109477B2

(12) United States Patent
Kuzan et al.

(10) Patent No.: US 7,109,477 B2
(45) Date of Patent: Sep. 19, 2006

(54) AUTOMATIC SAMPLE LOADER FOR USE WITH A MASS SPECTROMETER

(75) Inventors: Pawel Kuzan, Oakville (CA); Andrew Emili, Toronto (CA)

(73) Assignee: Engineering Services Inc., Toronto (CA)

( * ) Notice: Subject to any disclaimer, the term of this patent is extended or adjusted under 35 U.S.C. 154(b) by 18 days.

(21) Appl. No.: 10/813,571

(22) Filed: Mar. 31, 2004

(65) Prior Publication Data

US 2005/0218318 A1 Oct. 6, 2005

(51) Int. Cl.
*H01J 49/04* (2006.01)
*B01D 59/44* (2006.01)

(52) U.S. Cl. ...................... 250/288; 250/281; 250/282; 250/428; 250/435; 250/440.11; 73/864.91

(58) Field of Classification Search ..................... None
See application file for complete search history.

(56) References Cited

U.S. PATENT DOCUMENTS 4,879,458 A * 11/1989 Brunfeldt et al. ........... 250/288
5,037,611 A * 8/1991 Ledford, Jr. ................. 422/63
6,558,630 B1 * 5/2003 Degn et al. ................. 422/100
6,864,487 B1 * 3/2005 McMurtry et al. ..... 250/442.11
6,866,461 B1 * 3/2005 DeWinter et al. ...... 414/222.07

* cited by examiner

*Primary Examiner*—Nikita Wells
(74) *Attorney, Agent, or Firm*—Nancy E. Hill; Hill & Schumacher

(57) ABSTRACT

An automatic sample loader is for use in association with a mass spectrometer and at least one vial containing a sample. The loader includes a vial block, an insertion head, an insertion tube, a mechanism for pushing the sample out of the vial and a mechanism for moving the insertion head relative to the vial. The vial block has at least one vial cavity and each vial cavity is adapted to receive a vial. The insertion head is adapted to be sealingly engageable in the vial cavity. The insertion tube is operably connected to the mass spectrometer through the insertion head, such that the tube extends into the vial when the insertion head is sealingly engaged in the vial cavity. The pushing mechanism is adapted to push the sample out of the vial and into the tube. The moving mechanism is adapted to move the insertion head relative to the vial block from an engaged position to a disengaged position.

16 Claims, 3 Drawing Sheets

AUTOMATIC SAMPLE LOADER FOR USE WITH A MASS SPECTROMETER

FIELD OF THE INVENTION

This invention relates to support equipment for mass spectrometers and in particular an automatic sample loader for use in association with a mass spectrometer.

BACKGROUND OF THE INVENTION

Mass spectrometers are well known and are used in the analysis of a wide array of substances. The use and effectiveness of the mass spectrometers can be enhanced by providing a variety of optional support equipment. One such useful optional support equipment is an automatic sample loader or autosampler. Typically these are intended for the analysis of biochemical samples. One example of such a product is the Surveyor Autosampler™ from Thermo Finnigan. Although the design and capabilities of commercial autosamplers vary, they are, in general, effective in automatically loading liquid samples from a variety of containers, including source plates, vials, test tubes, etc. However, the methods these autosamplers use to handle sample material are not suitable for very low volume (typically below 20 µl) biological samples. Typically, a commercial autosampler first aspires the sample from its container and injects it into the sample loop of a specialized injection valve, when the valve is in load position. The valve is then switched to inject position and a metering pump pumps buffer to flush the sample from the sample loop through interconnecting tubing and into the mass spectrometer column.

Although this process works well for larger, chemical samples, it is not considered satisfactory for small biological samples for a number of reasons. For example a large part of the sample, sometimes as much as fifty percent (50%) is lost in the process due primarily to large dead volume (typically about 40 µl) on the intake side of the sample loop. As well this process is not desirable for small biological samples because the sample comes in contact with relatively large surfaces of conduits on its way from the container to the column and inevitably, some of the molecules attach to the walls, which leads to further loss of sample material and cross-contamination as the leftover material mixes with the newly transferred sample in the following cycle. Further the sample is diluted by the buffer, which requires larger volumes of the mixture to be pumped through the column.

As a result of these shortcomings small biological samples need to be loaded to the mass spectrometer column manually. This requires lab personnel to continuously attend to the operation of the instrument.

Accordingly it would be desirable to provide an autosampler that may be used with small biological samples.

SUMMARY OF THE INVENTION

The present invention is directed to an automatic sample loader for use in association with a mass spectrometer and at least one vial containing a sample. The loader includes a vial block, an insertion head, an insertion tube, a mechanism for pushing the sample out of the vial and a mechanism for moving the insertion head relative to the vial. The vial block has at least one vial cavity and each vial cavity is adapted to receive a vial. The insertion head is adapted to be sealingly engageable in the vial cavity. The insertion tube is operably connected to the mass spectrometer through the insertion head, such that the tube extends into the vial when the insertion head is sealingly engaged in the vial cavity. The pushing mechanism is adapted to push the sample out of the vial and into the tube. The moving mechanism is adapted to move the insertion head relative to the vial block from an engaged position to a disengaged position.

In another aspect of the invention there is provided a method of loading a sample for a mass spectrometer. The method includes the steps of:

- advancing a vial cavity having a vial with a sample therein into a predetermined position relative to an insertion head;
- lowering the insertion head into the vial cavity;
- coupling the insertion head into the vial cavity;
- applying pressure to the vial cavity whereby the sample is drawn into the insertion head;
- de-coupling the insertion head from the vial cavity.

Further features of the invention will be described or will become apparent in the course of the following detailed description.

BRIEF DESCRIPTION OF THE DRAWINGS

The invention will now be described by way of example only, with reference to the accompanying drawings, in which.

DETAILED DESCRIPTION OF THE INVENTION

The automatic sample loader of the present invention includes three main components namely the mechanical assembly, the control enclosure and the pressure regulator assembly.

The control enclosure is preferably a separate box (not shown on any of the drawings) that contains all electronic components and pneumatic valves 62, 64 (described in more detail below).

Figure 1:
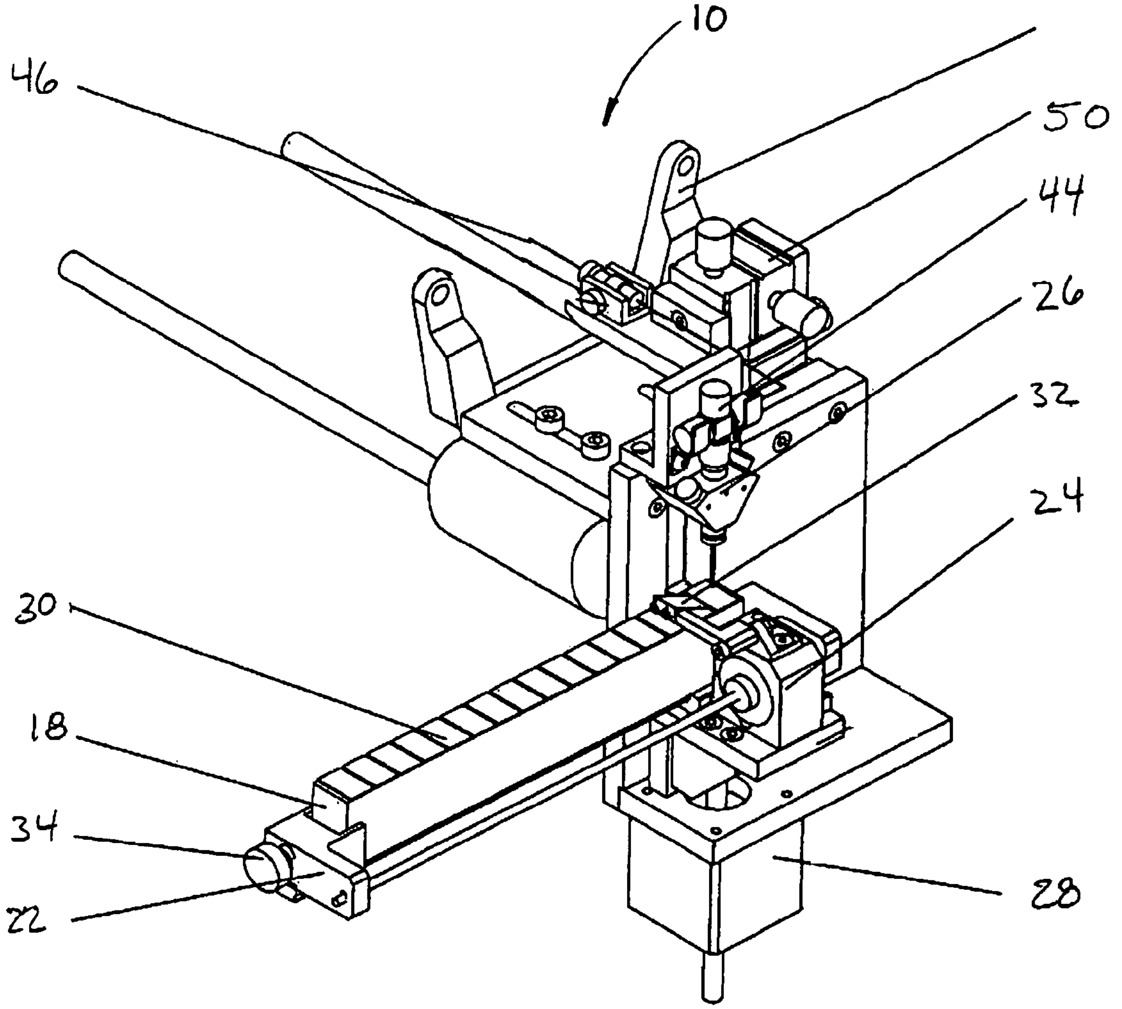
FIG. 1 is a perspective view of the automatic sample loader constructed in accordance with the present invention.

Referring to FIG. 1 the mechanical assembly of the autosampler is shown generally at 10. In order to reduce the length of the interconnecting tube, the mechanism is mounted directly in front of the mass spectrometer (not shown).

Figure 2:
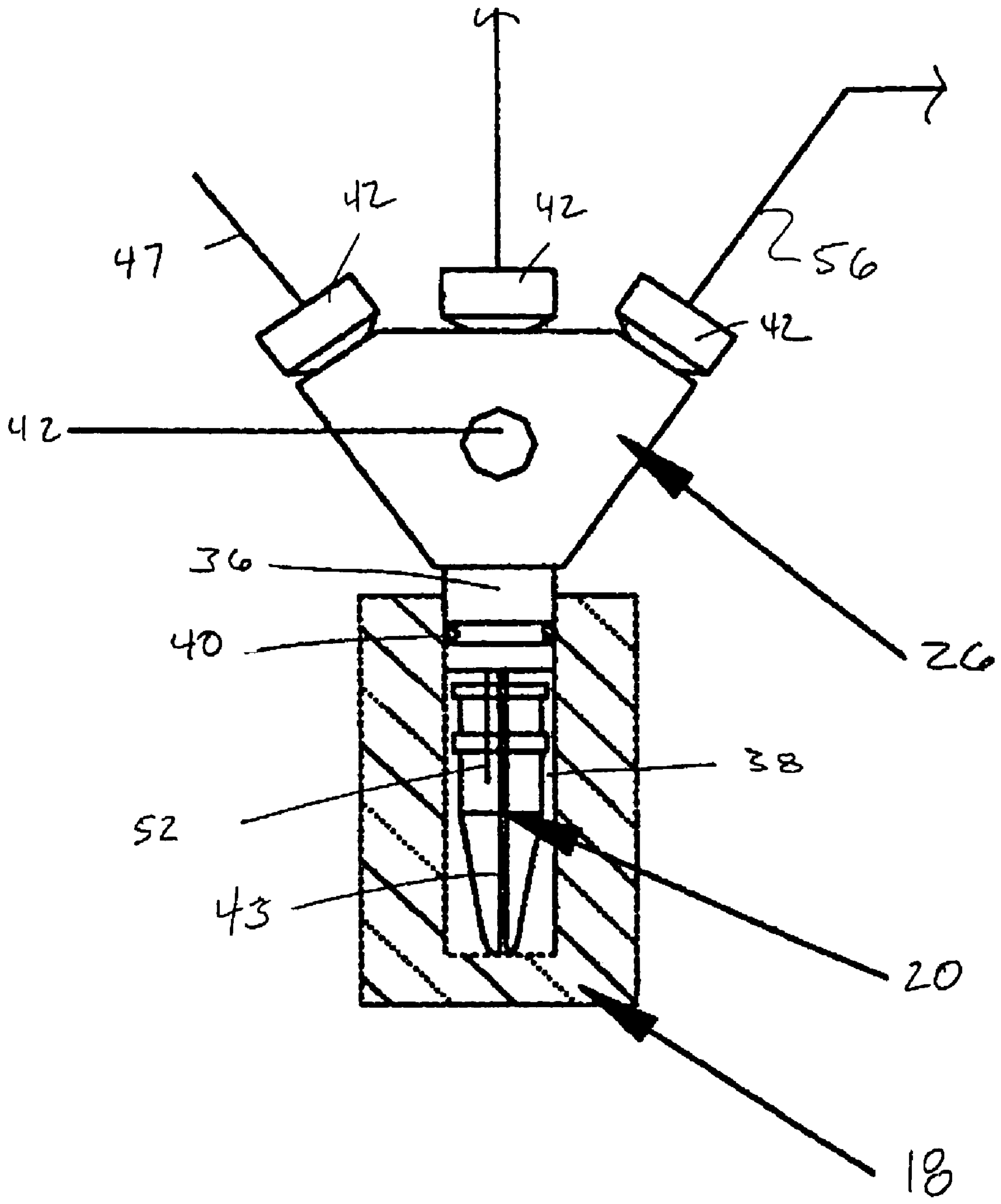
FIG. 2 is an enlarged sectional view of a vial cavity and an insertion head of the automatic sample loader of the present invention.

A vial holding block 18 contains a plurality of cavities 38 (shown in FIGS. 2 and 3) adapted to receive a plurality of vials 20 (shown in FIG. 2). The block 18 is mounted on a 2 degree-of-freedom linear positioning stage 22. Block 18 is held in position with a block clamp 34. Each vial 20 contains a sample. Horizontal block actuator 24 is used to move the block 18 horizontally in order to align subsequent vial cavities with the insertion head 26. Vertical block actuator 28 is used to raise the block 18 so that the insertion head 26 may be coupled with the selected vial cavity. To prevent evaporation of the sample material, each cavity in the vial holding block 18 is covered with a lid 30. An Arm 32 is used to remove the lids 30 from their respective cavities prior to the insertion of the insertion head 26. Sequence of horizontal actuator 24 moves is used to slide the lids 30 along the top surface of the block 18. It will be appreciated by those skilled in the art that there may be a number of different ways to remove lids 30 and the invention is not limited to the use of an arm to remove the lids 30.

Figure 3:
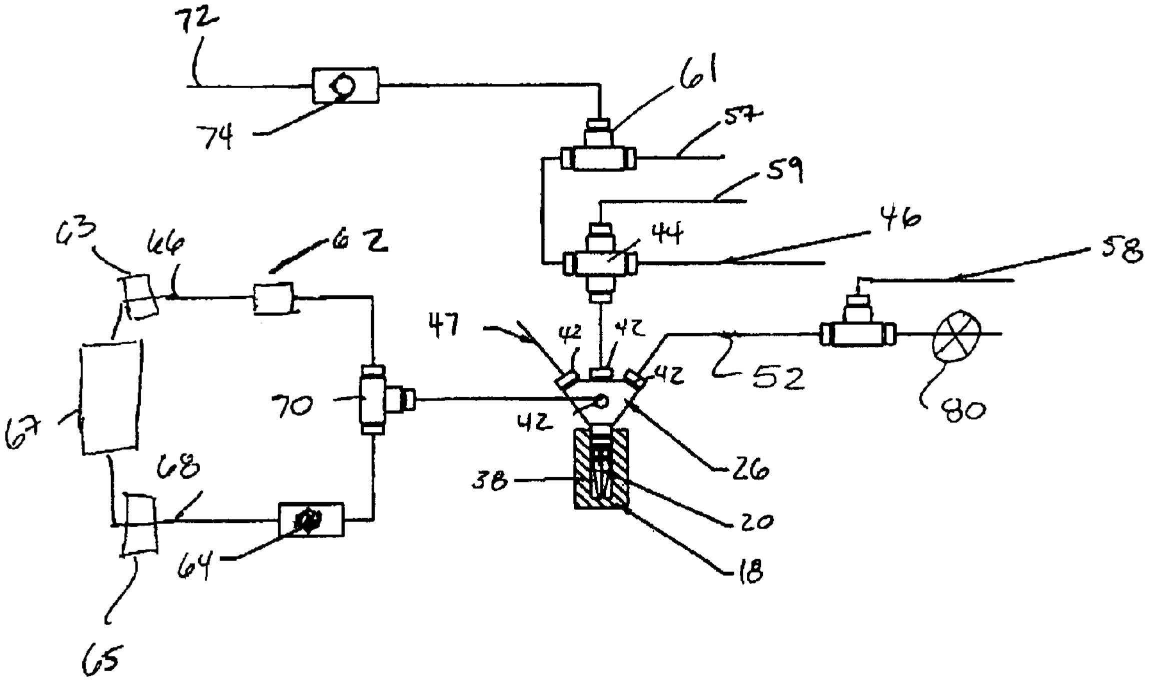
FIG. 3 is a schematic view of liquid and compressed gas systems of the automatic sample loader of the present invention.

Referring to FIGS. 2 and 3 insertion head 26 has a cylindrical protrusion 36 at the bottom thereof that matches the openings of vial cavities 38 in the block 18. An O-ring seal 40 is used to assure a leak-proof connection between the block 18 and the insertion head 26. Insertion head 26 has four pressure ports 42 for passing three tubes and one electrical conduit into the vial cavity 38. A passage (not shown) aligned with the center of the cylindrical protrusion 36 is used for the interconnecting tube 43. Interconnecting tube 43 extends downwardly from the cylindrical protrusion 36 such that the distal end of the tube reaches the bottom of the vial 20. The three tubes may, but need not, be identical in regard to material and diameter. All three tubes open to the cavity 38. The interconnecting tube 43 extends to the bottom of the vial (for sample pick-up); the waste tube 52 extends partway into the vial (for buffer or waste removal); the compressed gas tube (from tee 70 shown in FIG. 3) does not extend past the bottom of the cylindrical protrusion 36. Adapter 44 is used to connect the interconnecting tube 43 to the mass spectrometer column 46 and to the metering pump line 72 (shown in FIG. 3).

Mass spectrometer column 46 is connected to adapter 44. Mass spectrometer column 46 is supported by a 3 degree-of-freedom adjustment stage 50 (shown in FIG. 1). The adjustment stage 50 is used to accurately align the tip of the column 46 with the inlet orifice of the mass spectrometer (not shown).

The automatic sample loader of the present invention uses sensors to detect the presence of a sample in the vial. Preferably electronic sensors are used. An electronic circuit measures impedance between a first electrode 47 inserted into the vial 20 and a second electrode 57 connected to adapter 61 (as shown in FIG. 3). The first electrode 47 in the vial 20 extends parallel to the interconnecting tube 43 and is positioned in pressure port 42. A third electrode 59 is attached to adapter 44 and is for use by the mass spectrometer. Open contact between first 47 and second 57 electrodes indicates that there is no liquid between the electrodes and therefore the entire sample has been pushed out of the vial. A waste removal line electrode 58 is provided in buffer or waste removal line 52 and a similar method is used to detect the presence of liquid in the waste removal line 52 (shown in FIG. 3).

A schematic diagram of the liquid and compressed gas system or pressure regulator assembly is shown in part of FIG. 3. The vial cavity 38 with the insertion head coupled to it can be pressurized from either load pressure valve 62, or measurement pressure valve 64. Load pressure valve 62 is on load pressure line 66 and similarly measurement pressure valve 64 is on measurement pressure line 68. Load pressure valve 62 is connected to a load pressure regulator 63 and measurement pressure valve 64 is connected to measurement pressure regulator 65. Each of these is connected to gas cylinder 67. Load pressure line 66 and measurement pressure line 68 are connected to pressure line adaptor 70 which in turn is connected to one of the ports 42. Fluids can be removed from the vial cavity through waste removal line 52.

During the sample loading stage of the cycle the sample flows from the vial through the interconnecting tube 43 into the mass spectrometer column 46 via one of the ports 42. Load pressure is applied to the sample cavity to push the sample out of the vial 20. Waste removal valve 80 and waste removal line 52 are closed throughout the sample loading part of the cycle.

During the sample analysis stage of the cycle buffer is supplied by an external metering pump via metering pump line 72. An inline check valve 74 is provided on metering pump line 72 A small portion of buffer flows into the mass spectrometer column 46, while the majority flows into the vial through the interconnecting tube. Measurement pressure is applied to the vial cavity 38 in order to maintain the required flow of buffer through the column 46. Waste removal valve 80 opens from time to time to remove excess buffer from the vial.

Waste removal valve 80 is also used to release pressure from the vial cavity 38 after each part of the cycle.

In operation the following sequence of steps are executed for each sample processed by the system. Firstly there is a sample load stage and thereafter there is a sample analysis stage. In the sample load stage, firstly a vial 20 is advanced into position by horizontal actuator 24 moving vial holding block 18 in the positioning stage 22. The insertion head 26 is then coupled with the vial cavity 38 by raising the holding block 18 with vertical actuator 28. Thereafter a sample load pressure is applied to the vial cavity 38. The sensor is then used to monitor the end-of-sample, that is the sensor is used to determine when generally the entire sample has been pushed out of the vial 20. When the end-of-sample is detected, the pressure is released and the sample analysis stage begins. In the sample analysis stage sample analysis pressure is applied to the vial cavity 38. This pressure is generally lower than the sample load pressure. The sample analysis pressure is applied throughout the sample analysis stage. A preprogrammed combination of buffers is supplied during the sample analysis stage to the vial cavity 38 via the metering pump line. When the end-of-analysis signal is received from the mass spectrometer the next cycle is started. From time to time excess buffer is removed from the vial using the waste removal line 52 and waste valve 80. Although there is a sensor provided for the purpose of detecting presence of liquid in the waste line, in practice, since the pump output is constant, the waste removal valve is controlled by a simple on/off sequence.

The invention described herein provides a method and equipment for very-low-loss automatic injection of samples into the mass spectrometer column. The automatic sample loader performs a series of cycles, each consisting of two stages: namely sample loading and sample analysis.

During each cycle a vial 20 containing the sample is enclosed in a sealed vial cavity 38. A short section of tubing 43 connected on one end to the mass spectrometer column 46 and to the metering pump line 72 is inserted into the vial 20, such that the end of tube 43 reaches the bottom of the vial 20. The vial cavity 38 is also connected to the pressurized gas lines 66, 68 and to the waste removal line 52.

During the sample loading stage the metering pump does not supply any liquid. Pressure applied to the vial chamber will therefore push the sample through the interconnecting tube 43 and into the mass spectrometer column 46. A sensor is provided to detect the condition when the entire sample has been pushed out of the vial 20. When this condition is detected, automatic loader triggers the mass spectrometer and the metering pump, and switches to sample analysis stage.

During the sample analysis stage gas pressure (typically lower than the pressure used for sample loading) is applied to the vial chamber and the metering pump supplies a steady flow of preprogrammed combination of buffers. Small portion of the liquid flows through the mass spectrometer column and carries the sample material into the instrument. The majority of pump output flows through the interconnecting tube into the vial. This liquid flushes and cleans the interconnecting tube 43, thus eliminating sample cross-contamination. The excess of the buffer supplied by the metering pump is removed from the vial through the waste removal line 52.

As used herein, the terms "comprises" and "comprising" are to be construed as being inclusive and opened rather than exclusive. Specifically, when used in this specification including the claims, the terms "comprises" and "comprising" and variations thereof mean that the specified features, steps or components are included. The terms are not to be interpreted to exclude the presence of other features, steps or components.

It will be appreciated that the above description related to the invention by way of example only. Many variations on the invention will be obvious to those skilled in the art and such obvious variations are within the scope of the invention as described herein whether or not expressly described.

The invention claimed is:

1. An automatic sample loader for use in association with a mass spectrometer and at least one vial containing a liquid sample, the loader comprising:

a vial block having at least one vial cavity, each vial cavity adapted to receive a vial;

an insertion head adapted to be sealingly engageable in the vial cavity;

an insertion tube operably connected to the mass spectrometer through the insertion head, such that the tube extends into the vial when the insertion head is sealingly engaged in the vial cavity;

a means for pushing the liquid sample out of the vial and into the tube;

and a means for moving the insertion head relative to the vial block from an engaged position to a disengaged position.

2. An automatic sample loader as claimed in claim 1 wherein there are a plurality of vial cavities in the vial block and further including a means for advancing the vial block relative to the insertion head.

3. An automatic sample loader as claimed in claim 2 further including a two degree of freedom linear positioning stage and wherein the vial block is positioned in the positioning stage and movement of the positioning stage moves the vial block relative to the insertion head.

4. An automatic sample loader as claimed in claim 3 wherein each vial cavity includes a liftable lid and each lid is adapted to be lifted prior to moving into the engaged position.

5. An automatic sample loader as claimed in claim 3 wherein the insertion head includes a plurality of pressure ports and the insertion tube is connected through one of the plurality of pressure ports and the insertion tube extends into the vial when in the engaged position.

6. An automatic sample loader as claimed in claim 5 further including a waste tube which extends through another of the plurality of pressure ports in the insertion head.

7. An automatic sample loader as claimed in claim 6 further including a compressed gas tube which extends through another of the plurality of pressure ports in the insertion head whereby gas is pushed into the vial through the compressed gas tube and the contents of the vial are pushed into the insertion tube thus providing means for pushing the liquid sample out of the vial.

8. An automatic sample loader as claimed in claim 7 further including a sensor.

9. An automatic sample loader as claimed in claim 8 wherein the sensor includes a first electrode extendable into the vial and a second electrode and wherein an impedance measure therebetween provides an indication of the amount of the liquid sample in the vial.

10. An automatic sample loader as claimed in claim 9 further including a waste removal electrode connected to the waste tube.

11. An automatic sample loader as claimed in claim 10 further including a three degree of freedom adjustment stage adapted to support a mass spectrometer column which is operably connected to the mass spectrometer.

12. A method of loading a sample for a mass spectrometer comprising the steps of:

advancing a vial cavity having a vial with a liquid sample therein into a predetermined position relative to an insertion head;

lowering the insertion head into the vial cavity;

coupling the insertion head into the vial cavity;

applying pressure to the vial cavity whereby the liquid sample is drawn into the insertion head;

de-coupling the insertion head from the vial cavity.

13. A method of loading as claimed in claim 12 further including the step of determining if the vial is empty.

14. A method of loading as claimed in claim 13 further including the step of applying a buffer to the vial.

15. A method of loading as claimed in claim 14 further including the step of removing waste.

16. A method of loading as claimed in claim 12 wherein a plurality of vial cavities are provided in a vial block.

* * * * *